April 28, 1959  J. E. LILIENFELD  2,884,575
CONTAINER SEAL FOR ELECTROLYTIC CAPACITORS
Filed July 8, 1953
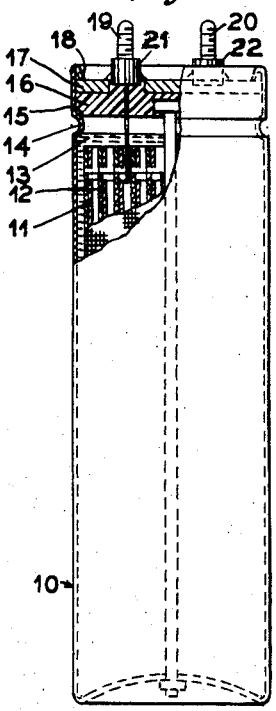
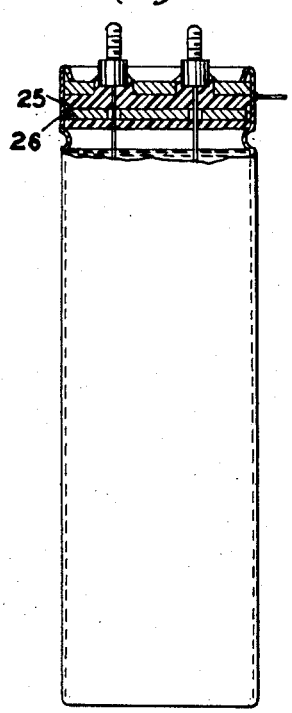
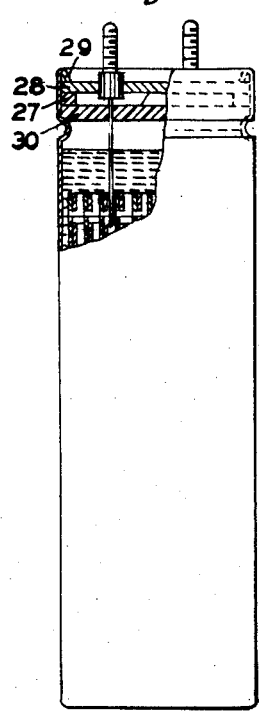
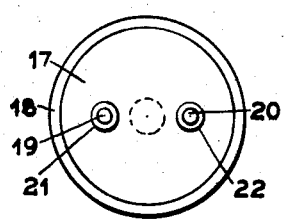
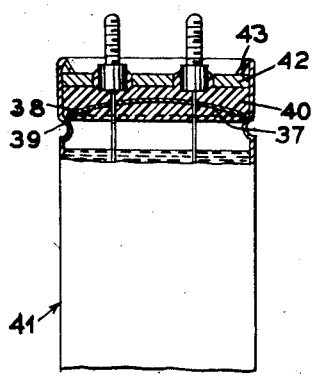
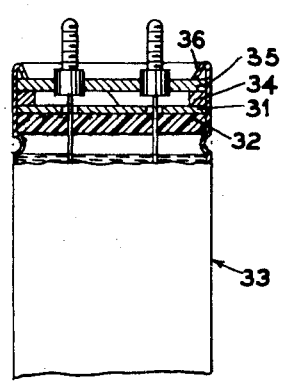
INVENTOR.
JULIUS EDGAR LILIENFELD
BY
*Holcombe Wetherill & Brisky*
ATTORNEYS

United States Patent Office 2,884,575
Patented Apr. 28, 1959

2,884,575

CONTAINER SEAL FOR ELECTROLYTIC CAPACITORS

Julius Edgar Lilienfeld, St. Thomas, Virgin Islands, assignor to Samuel D. Warren, Essex, and Ralph F. Burkard, Arlington, Mass., jointly Application July 8, 1953, Serial No. 366,809

9 Claims. (Cl. 317—230)

The invention relates to the electrically insulating sealing means in container assemblies, and more especially such as are used in connection with the housing of condenser electrodes in contact with electrolytes in the production of electrolytic capacitors. Difficulty has been experienced not only in regard to the design of a seal which will remain permanent under all conditions to which a capacitor is likely to be subjected; but, also, with respect to the use of certain electrolyte solvents and solutes which may deleteriously affect the material of which the seal is constituted. For example, in the use of acetone and like solvents, various prior utilized organic compounds including rubber, bitumen, and similar insulating materials not only absorb substantial volumes of the components of the electrolyte but in some instances are attacked thereby or by their vapors, or are soluble therein. Furthermore, sealing means which would involve gaskets and covers held to a container by screws or bolts and nuts do not admit of application to smaller type capacitors.

Capacitors in some instances must be constructed to withstand during operation a great range of temperatures, say from +85° C. to —55° C., under which the conventional type of container seal will not stand up. Thus, for condenser operation at low temperatures, it has been the practice to utilize electrolytes which remain adequately conducting, but at the higher temperatures these electrolytes set up vapor pressures within the sealed container for the electrolyte which are above the pressure of the ambient atmosphere. Since a container must be sealed substantially gastight in order to retain its electrolyte, provision has been made hereto for relieving such pressure through vents.

It is an object of this invention to provide a ventless sealing means for use with electrolytic capacitor assemblies and one which will make the capacitor stand up under the most rigorous conditions of temperature, pressure and use.

A further object of the invention is to provide a seal element which not only will effectively close the container against the escape of the electrolyte or its vapor, but at the same time secure adequate insulated sealing of one or more terminal leads therethrough; also to limit below the permissible pressure the accumulation of the gases produced by electrolysis.

A still further object of the invention is to provide a novel container and sealing plug assembly in electrolytic capacitors having a container with an internal ledge upon which the plug is seated.

Another object of the invention is to provide a capacitor of the electrolytic type utilizing an electrolyte comprising heavy organic molecules; and the novel construction of seal for its container is such that said heavy molecules are prevented from escaping and thus depleting the contents. At the same time, the novel seal allows for a slow diffusion out of the container of such lighter molecules as are being evolved by the extremely slow electrolysis caused by the leakage current so that even over long periods of operation no dangerous pressures will develop within the container. Thus, the only significant changes of pressure which occur are due to temperature variations of the vapor pressure due to said heavy organic molecules and for which the container is adequately sealed.

In carrying out the invention, there is provided a container of a suitable, generally conventional cylindrical shape, or at least having its mouth portion cylindrical. Slightly below said mouth, the wall of the container is indented to provide an inner circumferential ledge or shoulder portion. Upon this is seated an insulating cylindrical plug or disk, of suitable thickness, and comprising elastically deformable material which is inert with respect to the electrolyte, the solvent of which is essentially of an organic nature. As materials for such plug elastic, polymerized compounds, among which polyethylene has been found to be most suitable, may be utilized.

The said plug or disk of polyethylene is made of slightly less diameter than the inner diameter of the mouth portion of the container into which it is to be inserted. After insertion, the plug seats upon the circumferential ledge, and the rim of the vessel wall is crimped over said plug to retain it in position, thus closing the container effectively for service. Preferably a rigid metal disk is interposed between the plug and the crimped rim to hold the plug circumferentially between the crimp and the ledge, the pressure exerted upon the plug as a result of the crimping operation being adequate to seal it at its inner face to said ledge.

It has been found expedient in some instances to reinforce the plug by embedding therein a reinforcing element of more or less resiliency and either planar or curved; or, a resilient washer may be interposed between the plug and a metal disk located under the crimped rim, a further metal disk preferably being introduced below the said resilient washer, which is thus squeezed in between the two metal disks.

The nature of the invention, however, will best be understood when described in connection with the accompanying drawings, in which:

Figure 1 is a front elevation, partly in vertical section, illustrating an electrolytic capacitor assembly embodying the novel seal, and Figure 2 is a plan thereof.

Figures 3 and 4 are views similar to Figure 1, and illustrate modifications.

Figures 5 and 6 are fragmentary elevations, partly in vertical section, and illustrate further modifications in the capacitor seal means.

Referring to the drawings, more particularly Figure 1 thereof, an electrolytic capacitor 10 is shown comprising a cylindrical can of conventional type containing electrodes 11 and 12, at least one of which is an anodized electrode. The particular capacitor illustrated in Figure 1 is of the polarized type, while that of Figure 3 is of the non-polarized type. These electrodes are immersed in a suitable electrolyte 13 retained securely within the can by the novel sealing means inasmuch as the conventional means would be injuriously affected by anhydrous, non-hydrionizable electrolytes composed principally of organic compounds such as the ones disclosed in my United States Letters Patent No. 2,826,724, dated March 11, 1958.

In accordance with the invention, a circumferential indentation 14 is made near the upper end of the can to provide a shoulder or ledge 15 designed to receive and seat a sealing plug 16 of elastic polymerized thermoplastic gas-permeable compounds among which tempered or molded polyethylene has been found particularly suitable for the purpose, because of its chemical stability, its permeability to the gaseous products of electrolysis, and its ease of molding when heated, as well as because of its elastic property which is adequate within the required range of temperatures.

Overlying the plug is a disk 17 of metal to afford a surface for receiving the crimped-over edge of the rim wall 18. The crimping is effected in manner such that substantial pressure will be exerted on the disk 17 and transmitted to the plug to hold it securely to the seat 15 against any internal pressure that may possibly develop.

The respective electrodes 11 and 12 are connected to terminal posts or connector pins 19 and 20 through insulating bushings 21 and 22 thermally sealed to the plug 16, the conductor or lead portions passing through the plug being also thermally sealed thereto.

In some instances it has been found expedient further to reinforce the plastic plug. Thus, reference being had to Figure 3, the plug 25 has embedded therein a reinforcing element which, for example, may be resilient material such as the metal disk 26. Or, reference being had to Figure 4 of the drawings, a spring washer 27 of metal may be interposed between the disk 28, upon which the crimped rim 29 bears, and the plug 30. In Figure 6 there is indicated a further metal disk 31 which is located directly over the plug 32 sealing the interior of the capacitor 33, the spring washer 34 then bearing on said disk and a further metal disk 35 being located over said spring washer to receive the crimped-over edge 36 of the rim of the container.

By constructing the reinforcing element 37 dome-shaped or cupped, as shown in Figure 5, and making the circular edge 38 thereof of a diameter such as to cause the said edge to extend over the ledge 39 when said element is embedded in the plug 40, added strength is provided against cracking or buckling of the plug or leakage of the electrolyte around its edges while permitting escape of gaseous products of electrolysis from within the capacitor 41. To this end, the said edge 38 is advantageously brought closely to the said ledge, leaving only a thin section of the plastic material therebetween, and thus both controlling the permeability afforded to gases and amplifying the sealing forces exerted upon the electrolyte. Overlying the plug is a metal disk 42 to receive the crimped-over edge 43 of the top of the can of capacitor 41, as in the previously described embodiments.

The invention has many substantial advantages from the standpoint of simplicity of construction, small overall dimensions and stability under extremes of temperature, making it applicable to a wide variety of operating conditions and new types of electrolyte heretofore requiring complicated or expensive containers and seals, besides being effective in maintaining the electrolyte in good operating condition over a long period of time as shown by tests in the laboratory.

I claim:

1. A container assembly for electrolytic capacitors operating with an essentially anhydrous electrolyte of which the solvent is principally a vaporizable organic compound, comprising a vessel having a cylindrical end provided slightly below the mouth of the vessel with a circular indentation to afford an inner circular shoulder; an insulating plug sealing the vessel at said shoulder and consisting of an elastic, polymerized and gas-pervious, thermoplastic compound, inert to the said electrolyte and impervious to its vapor, and of an outer diameter slightly smaller than the inner diameter of said mouth, said plug resting freely on said shoulder, and the rim of the vessel wall being crimped inwardly over the plug as a means to hold the latter to the vessel and to force it circumferentially into sealing contact along said shoulder; and at least one lead passing through the plug and thermally self-sealed thereto.

2. A container assembly according to claim 1, wherein the plug material consists of polyethylene.

3. A container assembly according to claim 1, wherein a reinforcing element is associated with the plug.

4. A container assembly according to claim 3, wherein the reinforcing element is of resilient material.

5. A seal for a container assembly according to claim 4, wherein the reinforcing element is embedded in the plug.

6. A seal for a container assembly according to claim 5, wherein the reinforcing element is dome-shaped with edge extending over the shoulder.

7. A seal for an electrolytic capacitor of the type having an essentially anhydrous electrolyte of which the solvent contains a vaporizable organic compound and a container having an inner contraction in its throat forming a continuous support encircling its outlet below its mouth, said seal being adapted to be seated on said support portion of said container and comprising a plug having a seat portion corresponding in peripheral shape to said support, said plug consisting of an elastic, gas-pervious, polymerized and thermoplastic compound inert to said electrolyte and impervious to its vapor, and at least one passage through said plug through which runs an electrode terminal, the thermoplastic material encircling each such passage being thermally self-sealed to the terminal.

8. A seal as set forth in claim 7, wherein the plastic plug has embedded therein a disk-like metallic reinforcing element provided with a perforation in alignment with each passage.

9. A seal as set forth in claim 8, wherein the thermoplastic compound is polyethylene and the reinforcing element is resilient.

References Cited in the file of this patent

UNITED STATES PATENTS

| | | |
|---|---|---|
| 2,202,166 | Peck | May 28, 1940 |
| 2,225,801 | Schnoll | Dec. 24, 1940 |
| 2,240,836 | Cotton | May 6, 1941 |
| 2,246,933 | Deeley | June 24, 1941 |
| 2,298,441 | Waterman | Oct. 13, 1942 |
| 2,576,227 | Hutchins | Nov. 27, 1951 |
| 2,636,062 | Colton | Apr. 21, 1953 |
| 2,743,399 | Bujan | Apr. 24, 1956 |
| 2,744,217 | Aikman | May 1, 1956 |

OTHER REFERENCES

Modern Plastics, February 1944; pages 99, 178 and 180.